Figure 1:
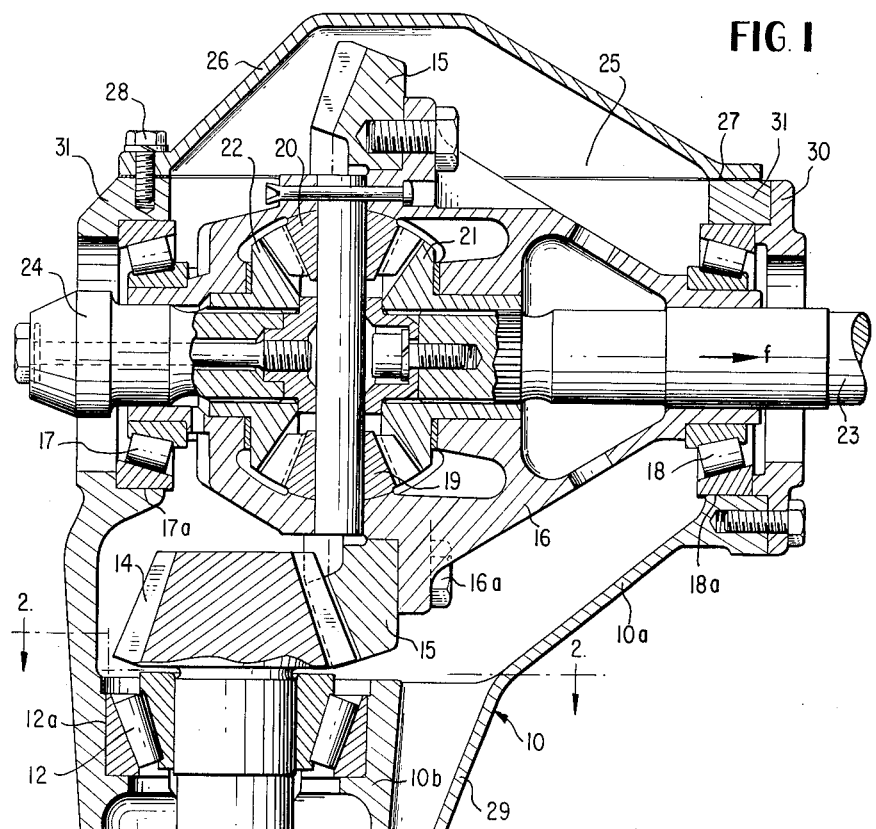

Aug. 3, 1965 A. J. MÜLLER 3,198,036
AXLE GEAR CONSTRUCTION
Filed Jan. 14, 1963 2 Sheets-Sheet 1

INVENTOR.
ALF JOHN MÜLLER
BY *Dicke & Craig*
ATTORNEYS

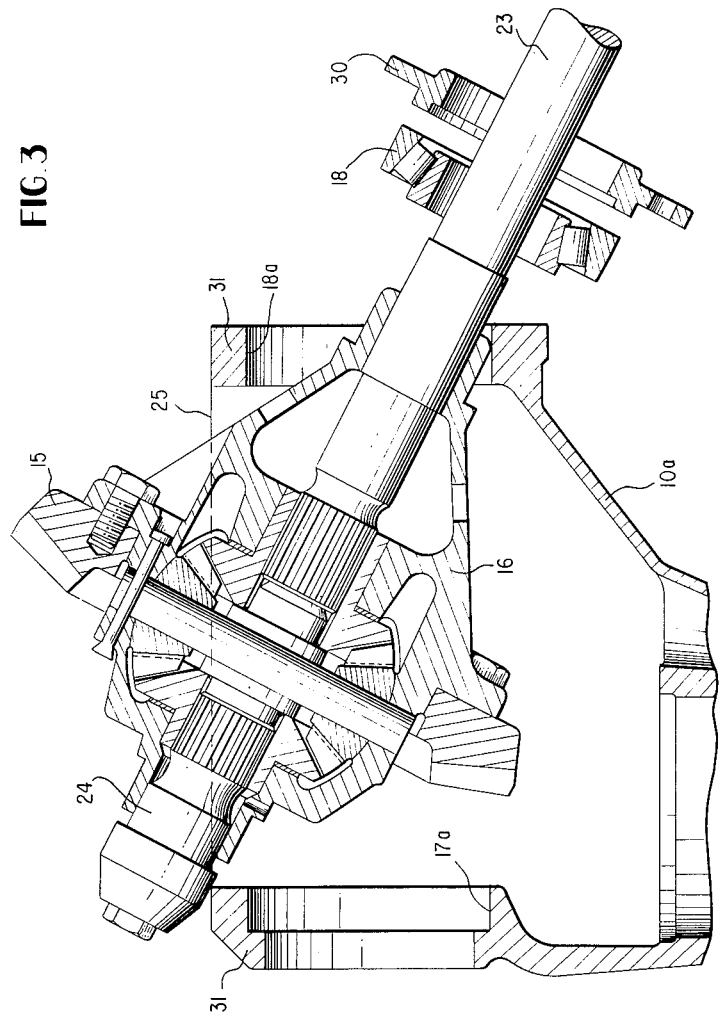

United States Patent Office 3,198,036
Patented Aug. 3, 1965

3,198,036
AXLE GEAR CONSTRUCTION
Alf John Müller, Stuttgart-Bad Cannstatt, Germany, assignor to Daimler-Benz Aktiengesellschaft, Stuttgart-Unterturkheim, Germany
Filed Jan. 14, 1963, Ser. No. 251,264
Claims priority, application Germany, Jan. 19, 1962,
D 37,955
14 Claims. (Cl. 74—710)

The present invention relates to an axle gear for motor vehicles, and more particularly, to an axle gear construction for motor vehicles which includes a housing-like differential body serving for the bearing support of the gear wheels and axle shafts, and of which the axle gear housing is so constructed and arranged in one piece as to permit assembly and disassembly of the differential body as a unit.

Axle gears, especially rear axle gears, of motor vehicles are, as a rule, subdivided for purposes of assembly and disassembly of the differential body serving for the bearing support of the gear wheels and of the axle shafts in such a manner that one of the axle shaft bearings is arranged in a separate housing part so that after removal thereof the differential body may be disassembled in the direction of the axle shafts. Such a construction, however, results in a relatively expensive and costly manufacture by reason of the precision which is necessary for the meshing teeth engagement of the gear wheels transmitting the drive from the drive shaft to the axle shafts, especially of a pinion and of a spur bevel gear. Additionally, by reason of the subdivision of the axle gear housing, the rigidity thereof is impaired.

The present invention aims, above all, at a manufacturing simplification with simultaneous high precision of the transmission elements, and essentially consists in that the axle gear housing which is provided with lateral apertures for the bearing support of a differential body, is undivided, i.e., integral concentrically to the axis of the axle shafts and is provided, transversely to this axis, with a lateral aperture of such size that the differential body, inclusive a spur bevel gear connected therewith and the two axle shafts supported therein, can be removed after removal of a bearing, for example, of a roller bearing out of the aforementioned bearing apertures in an inclined position through the lateral aperture of the housing.

Preferably, the housing part for supporting the drive shaft operable to drive the axle gear and disposed transversely to the axle shafts is also undivided, that is, integral and forms one integral piece with the main part of the axle gear housing containing the bearing apertures for the axle shafts.

It is possible by the present invention to realize the bearing bores for the differential body and for all of the axle shafts with a high accuracy during the same clamping or chucking operation of the axle gear housing, so that complicated finishing or fitting operations, especially also of the pinion and spur bevel gear may be dispensed with.

The axle gear housing according to the present invention is simultaneously reinforced by reason of the undivided construction so that it may be made of light metal such as aluminum, aluminum alloys, etc. and considerable savings in weight are attainable.

A further reinforcement is feasible by reason of the fact that the radial ribs are provided between the housing part for the bearing support of the axle-gear drive shaft and the remainder axle-gear housing, that is especially the main part of the housing accommodating the axle gear.

Accordingly, it is an object of the present invention to provide an axle-gear construction for motor vehicles of the type mentioned hereinabove which eliminates, in an effective manner and by simple means, the drawbacks encountered with the prior art constructions.

It is another object of the present invention to provide an axle-gear construction for motor vehicles, especially a rear axle-gear construction in which the housing is made in one piece without, however, impairing the ease of assembly or disassembly of the axle-gear elements as a subassembly unit.

Still another object of the present invention resides in the provision of an axle-gear for motor vehicles which permits of relatively inexpensive manufacture while at the same time maintaining a very high precision in the dimensions and locations of the bearing supports for the various bearings of the different axle-gear parts.

A still further object of the present invention resides in the provision of a unitary axle-gear housing which exhibits higher rigidity, greater ease of manufacture and improved precision in the bearing surfaces thereof.

Another object of the present invention resides in the provision of an axle-gear housing which only requires the handling of a single detachable element to enable assembly and disassembly, as a unit, of the differential gear together with the axle shafts thereof.

Still another object of the present invention resides in the provision of an axle-gear housing in which the various bearing surfaces may be machined during the same chucking operation of the housing so as to obviate complicated, time-consuming and costly fitting operations.

Figure 2:
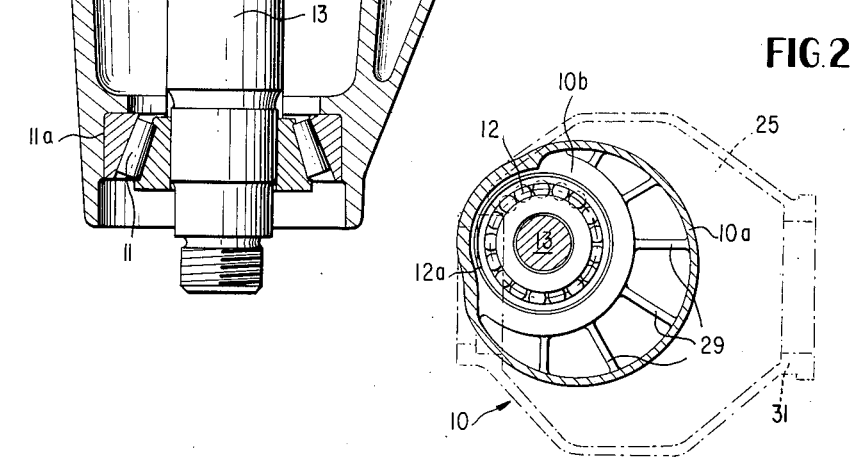

Another object of the present invention resides in the provision of an axle-gear construction for motor vehicles of which the axle gear housing may be made of reduced weight by the use of light-weight metals without impairing the strength and rigidity of the housing These and other objects, features and advantages of the present invention will become more obvious from the following description when taken in connection with the accompanying drawing which shows, for purposes of illustration only, one embodiment in accordance with the present invention, and wherein FIGURE 1 is an axial cross-sectional view through an axle-gear housing in accordance with the present invention with installed differential body, FIGURE 2 is a cross-sectional view, on a reduced scale, through the axle-gear housing of FIGURE 1, taken along the line 2—2, and FIGURE 3 is a partial cross-sectional view, similar to FIGURE 1, through the axle-gear housing in accordance with the present invention in which the differential body, together with the axle drive bevel wheel and axle shafts is shown in an inclined position within the housing, during assembly or disassembly thereof.

Referring now to the drawing wherein like reference numerals are used throughout the various views to designate like parts, reference numeral 10 generally designates therein the axle-gear housing which consists of a forward housing bearing part 10b and of the main housing part 10a. The drive shaft 13 is rotatably supported by means of bearings 11 and 12 in the bearing apertures 11a and 12a provided within the forward housing bearing part 10b. The drive shaft is driven from the engine in any suitable known manner, for example, by a Cardan shaft or the like and carries at the rear end thereof the pinion or bevel gear driver 14.

The axle drive bevel wheel or spur bevel gear 15 is in meshing engagement with the bevel gear driver 14. The spur bevel gear 15 is rigidly connected with the differential body 16 by means of bolts 16a. The differential body 16 is supported by means of bearings 17 and 18 in the bearing apertures 17a and 18a provided within the main part 10a of the housing 10. The differential body 16, in turn, serves for the bearing support of the gear wheels 19, 20, 21 and 22 of the differential gear as well as for the bearing support of the axle shaft 23 connected with the gear wheel 21 for rotation in unison therewith and leading to one of the rear wheels and of the axle shaft stub 24 which is connected with the gear wheel 22 and, for example, by means of a joint with the axle shaft leading to the other rear wheels.

As may be readily ascertained from the drawing, the main part 10a and the housing bearing part 10b of the axle-gear housing 10 consist of an undivided, integral cast piece which includes the apertures 17a and 18a for the bearings 17 and 18 as well as the apertures 11a and 12a for the bearings 11 and 12 of the drive shaft.

For purposes of installation of the differential body 16 together with the spur bevel gear 15 and the axle shafts 23 and 24, the axle-gear housing 10 is provided on the side opposite the drive shaft 13 with an additional aperture 25. This aperture 25 is closed by a lid 26 which forms a separating joint 27 with the housing 10 and is secured thereat by means of bolts 28.

For purposes of reinforcing the housing part 10b or for purposes of reinforcing this housing part 10b against the main part 10a, there are provided additionally ribs 29 which are arranged in a star-shaped manner with respect to the axis of the drive shaft 13 toward the one side of the housing which further protrudes outwardly.

The aperture 25 thereby has such a width that the differential body 16 together with the spur bevel gear 15 and the axle drive shafts 23 and 24 may be assembled and disassembled laterally notwithstanding the unitary construction of the housing 10 as appears particularly clearly from FIGURE 3. For that purpose, the closure flange retaining the bearing 18 in the axial direction is at first removed and displaced along the axle shaft 23 in the direction of arrow f. Thereupon, the differential body 16 together with the parts secured thereat are also displaced in the direction of arrow f, whereby the bearing 18 leaves the bearing bore 18a and the bearing 17 and the bearing aperture 17a so that the differential body 16 may be brought to an inclined position within the axle-gear housing and may be moved past the flange-like housing part 31 defining the separating joint 27. Thereafter, the differential body together with the spur bevel wheel 15 and the other parts mounted thereon may be removed laterally through the aperture 25. The bearing 17, instead of remaining at the differential body 16, may also be slid off the differential body 16 during movement of the latter in the direction of arrow f, or may retain its position within the bearing aperture 17a.

While I have shown and described one embodiment in accordance with the present invention, it is understood that the same is not limited thereto but is susceptible of numerous changes and modifications within the spirit and scope thereof, and I therefore do not wish to be limited to the details shown and described herein but intend to cover all such changes and modifications as are encompassed by the scope of the appended claims.

I claim:

1. An axle gear for motor vehicles comprising:
an axle gear housing
a differential including housing-like differential body means, a spur bevel gear operatively connected with said differential body means, and a plurality of gear wheels,
axle shaft means operatively connected with some of said gear wheels,
said housing-like differential body means surrounding at the two ends thereof said axle shaft means and serving for the bearing support of said axle shaft means and of said gear wheels,
said axle gear housing being an integral structure and substantially enclosing on all sides and surrounding said differential including said housing-like differential body means, said spur bevel gear, and said plurality of gear wheels,
said axle gear housing being further provided with bearing aperture means for the bearings of two ends of said differential body means,
bearing means for said bearing aperture means,
means for removably retaining one of the bearing means for the ends of said differential body means in the respective bearing aperture means,
said axle gear housing being additionally provided with a lateral aperture disposed substantially transversely to the axis of said axle shaft means and within a plane located outside the bearing aperture means for the assembly and disassembly of said differential body means inclusive said spur bevel gear wheel,
said lateral aperture being of such size that said differential body means together with said spur bevel gear and with at least one of said axle shaft means supported therein may be removed in the inclined position thereof through said lateral aperture out of the axle gear housing upon removal of said removably retained bearing means.

2. An axle gear for motor vehicles comprising:
an axle gear housing,
a differential including housing-like differential body means, a spur bevel gear operatively connected with said differential body means, and a plurality of gear wheels,
axle shaft means operatively connected with some of said gear wheels with one of said axle shaft means constructed as stub axle member,
said housing-like differential body means surrounding at the two ends thereof said axle shaft means and serving for the bearing support of said axle shaft means and of said gear wheels,
said axle gear housing being an integral structure and substantially enclosing on all sides and surrounding said differential including said housing-like differential body means, said spur bevel gear, and said plurality of gear wheels,
said axle gear housing being further provided with bearing aperture means for the bearings of the two ends of said differential body means,
bearing means for said bearing aperture means,
means for removably retaining one of the bearing means for the ends of said differential body means in the respective bearing aperture means,
said axle gear housing being additionally provided with a lateral aperture, said lateral aperture disposed substantially transversely to the axis of said axle shaft means and within a plane located outside the bearing aperture means for the assembly and disassembly of said differential body means inclusive said spur bevel gear wheel,
said lateral aperture being of such size that said differential body means together with both axle shaft means supported therein may be removed in the inclined position thereof through said lateral aperture out of the axle gear housing upon removal of said removably retained bearing means.

3. An axle gear for motor vehicles comprising:
an axle gear housing,
a differential including housing-like differential body means, a spur bevel gear operatively connected with said differential body means, and a plurality of gear wheels,
axle shaft means operatively connected with some of said gear wheels,
said housing-like differential body means surrounding at the two ends thereof said axle shaft means and serving for the bearing support of said axle shaft means and of said gear wheels,
said axle gear housing being an integral structure and substantially enclosing on all sides and surrounding said differential including said housing-like differential body means, said spur bevel gear, and said plurality of gear wheels, said axle gear housing being further provided with bearing aperture means for the bearings of two ends of said differential body means, bearing means for said axle shaft means inserted directly into the corresponding bearing aperture means, means for removably retaining one of the bearings for the axle shaft means in the corresponding bearing aperture means, said axle gear housing being additionally provided with a lateral aperture, said lateral aperture disposed transversely to the axis of said axle shaft means and within a plane located outside the bearing aperture means for the assembly and disassembly of said differential body means inclusive said spur bevel gear wheel, said lateral aperture being of such size that said differential body means together with said spur bevel gear and with at least one of said axle shaft means supported therein may be removed through said lateral aperture out of the axle gear housing in the inclined position thereof upon removal of said removably retained bearing.

4. An axle gear for motor vehicles comprising:

an axle gear housing including a main housing part for the differential and the axle shaft means, and a forward housing part for the drive shaft, a differential including housing-like differential body means, a spur bevel gear secured to said differential body means, and a plurality of gear wheels, axle shaft means operatively connected with some of said gear wheels, said housing-like differential body means serving for the bearing support of said axle shaft means and of said gear wheels, a drive shaft extending substantially transversely to the axis of said axle shaft means and including a pinion in meshing engagement with said spur bevel gear, said axle gear housing being provided with bearing aperture means for said axle shaft means and said drive shaft and being undivided substantially concentrically to the axis of said axle shaft means and substantially concentrically to said drive shaft, and said forward housing part being formed in one piece with said main housing part, said axle gear housing being additionally provided with a lateral aperture disposed rearwardly and substantially transversely to the axis of said axle shaft means for the assembly and disassembly of said differential body means inclusive said spur bevel gear wheel and at least one of said axle shaft means, bearing means in said bearing aperture means, means for removably retaining one of the bearing means for one of said axle shaft means in the respective bearing aperture means, said lateral aperture being of such size that said differential body means together with the one axle shaft means supported therein may be removed in an inclined position thereof through said lateral aperture out of the housing upon removal of said removably retained bearing means.

5. An axle gear for motor vehicles comprising:

an axle gear housing including a main housing part for the differential and axle shaft means and, a forward housing part for the drive shaft, said forward housing part being surrounded by a jacket-like housing portion of the axle gear housing and reinforcing rib means for reinforcing said forward housing part against said jacket-like housing portion, a differential including housing-like differential body means, a spur bevel gear secured to said differential body means, and a plurality of gear wheels, axle shaft means operatively connected with some of said gear wheels, said housing-like differential body means serving for the bearing support of said axle shaft means and of said gear wheels, a drive shaft extending substantially transversely to the axis of said axle shaft means and including a pinion in meshing engagement with said spur bevel gear, said axle gear housing being provided with bearing aperture means for said axle shaft means and said drive shaft and being undivided substantially concentrically to the axis of said axle shaft means and substantially concentrically to said drive shaft, and said forward housing part being formed in one piece with said main housing part, said axle gear housing being additionally provided with a lateral aperture disposed substantially transversely to the axis of said axle shaft means for the assembly and disassembly of said differential body means inclusive said spur bevel gear wheel, and said axle shaft means, bearing means in said bearing aperture means, means for removably retaining one of the bearing means for one of said axle shaft means in the respective bearing aperture means, said lateral aperture being of such size that said differential body means together with the one axle shaft means supported therein as well as together with the other axle shaft means supported therein and constructed in the manner of an axle stub may be removed in an inclined position thereof through said lateral aperture out of the housing upon removal of said removably retained bearing means.

6. An axle gear for motor vehicles comprising:

an axle gear housing, a differential including housing-like differential body means, a spur bevel gear operatively connected with said differential body means, and a plurality of gear wheels, axle shaft means operatively connected with some of said gear wheels with one of said axle shaft means constructed as stub axle member, said housing-like differential body means surrounding at the two ends thereof said axle shaft means and serving for the bearing support of said axle shaft means and of said gear wheels, said axle gear housing being an integral structure and substantially enclosing on all sides and surrounding said differential including said housing-like differential body means, said spur bevel gear, and said plurality of gear wheels, said axle gear housing being further provided with bearing aperture means for the bearings of said axle shaft means and of said differential body means, bearing means for said axle shaft means inserted directly into the corresponding bearing aperture means, means for removably retaining one of the bearings for the axle shaft means in the corresponding bearing aperture means, said axle gear housing being additionally provided with a lateral aperture, said lateral aperture disposed transversely to the axis of said axle shaft means and within a plane located outside said bearing aperture means for the assembly and disassembly of said differential body means inclusive said spur bevel gear wheel, said lateral aperture being of such size that said differential body means together with said spur bevel gear and with both axle shaft means supported therein may be removed through said lateral aperture out of the axle gear housing in the inclined position thereof upon removal of said removably retained bearing.

7. An axle gear for motor vehicles comprising:

an axle gear housing including a main housing part for the differential and axle shaft means and a forward housing part for the drive shaft, said forward housing part being surrounded by a jacket-like housing portion of the axle gear housing and inwardly extending reinforcing rib means for reinforcing said forward housing part against said jacket-like housing portion, a differential including housing-like differential body means, a spur bevel gear secured to said differential body means, and a plurality of gear wheels, axle shaft means operatively connected with some of said gear wheels, said housing-like differential body means serving for the bearing support of said axle shaft means and of said gear wheels, a drive shaft extending substantially transversely to the axis of said axle shaft means and including a pinion in meshing engagement with said spur bevel gear, said axle gear housing being provided with bearing aperture means for said axle shaft means and said drive shaft and being undivided substantially concentrically to the axis of said axle shaft means and substantially concentrically to said drive shaft, and said forward housing part being formed in one piece with said main housing part, said axle gear housing being additionally provided with a lateral aperture disposed substantially transversely to the axis of said axle shaft means for the assembly and disassembly of said differential body means inclusive said spur bevel gear wheel, and said axle shaft means, bearing means in said bearing aperture means, means for removably retaining one of the bearing means for one of said axle shaft means in the respective bearing aperture means, said lateral aperture being of such size that said differential body means together with the one axle shaft means supported therein may be removed in an inclined position thereof through said lateral aperture out of the housing upon removal of said removably retained bearing means.

8. An axle gear for motor vehicles comprising: an axle gear housing including a main housing part for the differential and axle shaft means, and a forward housing part for the drive shaft; said forward housing part comprising a bearing housing portion, a jacket-like housing portion at least partly surrounding said bearing housing portion and radially spaced inwardly extending reinforcing rib means for reinforcing said bearing housing portion against said jacket-like housing portion; a differential including housing-like differential body means, a spur bevel gear secured to said differential body means, and a plurality of gear wheels, axle shaft means operatively connected with some of said gear wheels, said housing-like differential body means serving for the bearing support of said axle shaft means and of said gear wheels, a drive shaft extending substantially transversely to the axis of said axle shaft means and including a pinion in meshing engagement with said spur bevel gear, supporting means for supporting said drive shaft within said bearing housing portion; said axle gear housing being provided with bearing aperture means for said housing-like differential body axially arranged to said axle shaft means and being undivided substantially concentrically to the axis of said axle shaft means and substantially concentrically to said drive shaft, and said forward housing part being formed in one piece with said main housing part; said axle gear housing being additionally provided with a lateral aperture disposed substantially transversely to the axis of said axle shaft means for the assembly and disassembly of said differential body means inclusive said spur bevel gear wheel.

9. In an axle gear for motor vehicles having a differential body, serving for the bearing support of differential gear wheels and axle shafts, which in turn is supported with the two ends thereof surrounding said axle shafts in bearings disposed in bearing apertures formed within an axle gear housing, the improvement essentially consisting of an axle gear housing substantially enclosing on all sides and terminating rearwardly of the bearing apertures formed within the axle gear housing to provide an aperture of such size that said differential body, together with at least one axle shaft supported therein, may be removed in an inclined position thereof through said aperture out of the housing.

10. In an axle gear for motor vehicles having a differential body, serving for the bearing support of differential gear wheels and axle shafts, which in turn is supported with the two ends thereof surrounding said axle shafts in bearings disposed in bearing apertures formed within an axle gear housing that is undivided concentrically to the axis of said axle shafts, and in which the axle gear housing is additionally provided with a lateral aperture for the assembly and disassembly of said differential body means inclusive the spur bevel gear connected thereto, the improvement essentially consisting of an axle gear housing being an integral structure and substantially enclosing on all sides and surrounding said differential body and said differential gear wheels, said lateral aperture being substantially transverse to the axis of said axle shafts and provided within a plane located outside the bearings disposed in the bearing apertures formed within the axle gear housing, said lateral aperture being of such size that said differential body together with at least one axle shaft supported therein may be removed in an inclined position thereof through said lateral aperture out of the housing upon removal of a bearing from a respective bearing aperture.

11. In an axle gear for motor vehicles having a differential body, serving for the bearing support of differential gear wheels and axle shafts, which in turn is supported with the two ends thereof surrounding said axle shafts in bearings disposed in bearing apertures formed within an axle gear housing that is undivided concentrically to the axis of said shafts, and in which the axle gear housing is additionally provided with a lateral aperture for the assembly and disassembly of said differential body means inclusive the spur bevel gear connected thereto, the improvement essentially consisting of an axle gear housing being an integral structure and substantially enclosing on all sides and surrounding said differential body and said differential gear wheels, said lateral aperture being substantially transverse to the axis of said axle shafts and provided within a plane located outside the bearings disposed in the bearing apertures formed within the axle gear housing, said lateral aperture being of such size that said differential body together with the one axle shaft supported therein as well as together with the other axle shaft supported therein and constructed in the manner of an axle stub may be removed in an inclined position thereof through said aperture out of the housing upon removal of a bearing from a respective bearing aperture.

12. In an axle gear for motor vehicles having a differential body, serving for the bearing suport of differential gear wheels and axle shafts, which in turn is supported with the two ends thereof surrounding said axle shafts in bearings disposed in bearing apertures formed within an axle gear housing that is undivided concentrically to the axis of said axle shafts, the improvement essentially consisting of an axle gear housing being an integral structure and substantially enclosing on all sides said axle gear housing terminating rearwardly of the bearing apertures formed within the axle gear housing substantially transverse to the axis of said axle shafts so as to provide a substantially flat gear housing sealing surface and further to define a lateral aperture of such size that said differential body, together with at least one axle shafts supported therein may be removed in an inclined position thereof through said lateral aperture out of the housing upon removal of a bearing from a respective bearing aperture, an axle gear housing lid, said axle gear housing lid being removably fastened to said axle gear housing at said axle gear housing sealing surface.

13. In an axle gear for motor vehicles having a differential body, serving for the bearing support of differential gear wheels and axle shafts which in turn is supported within the two ends thereof surrounding said axle shafts in bearings disposed in bearing apertures formed within an axle gear housing that is undivided concentrically to the axis of said axle shafts, the improvement essentially consisting of an axle gear housing being an integral structure and substantially enclosing on all sides said axle gear housing terminating rearwardly of the bearing aperture formed within the axle gear housing substantially transverse to the axis of said axle shafts so as to provide a substantially flat gear housing sealing surface and further to define a lateral aperture of such size that said differential body together with at least one axle shaft supported therein may be removed in an inclined position thereof through said lateral aperture out of the housing upon removal of a bearing from a respective bearing aperture, said bearing associated with said one axle shaft being axially removable from said respective bearing aperture along the axis of said one axle shaft, thereby to provide an increased angle of inclination of said differential body during the removal of said differential body through said lateral aperture out of the housing, an axle gear housing lid, said axle gear housing lid removably fastened to said axle gear housing at said axle gear housing sealing surface.

14. In an axle gear for motor vehicles having a differential body, serving for the bearing support of differential gear wheels and axle shafts which in turn is supported within the two ends thereof surrounding said axle shafts in bearings disposed in bearing apertures formed within an axle gear housing and which includes an integral main housing part for the differential and axle shafts and a forward housing part for a drive shaft, the improvement essentially consisting of a forward housing part being surrounded by a jacket-like housing portion of the axle gear housing and radially spaced inwardly extending reinforcing rib means for reinforcing said forward housing part against said jacket-like housing portion, an axle gear housing being an integral structure and substantially enclosing on all sides said axle gear housing terminating rearwardly of the bearing aperture formed within the axle gear housing substantially transverse to the axis of said axle shafts so as to provide a substantially flat gear housing sealing surface and further to define a lateral aperture of such size that said differential body together with at least one axle shaft supported therein may be removed in an inclined position thereof through said lateral aperture out of the housing upon removal of a bearing from a respective bearing aperture, said bearing associated with said one axle shaft being axially removable from said respective bearing aperture along the axis of said one axle shaft, thereby to provide an increased angle of inclination of said differential body during the removal of said differential body through said lateral aperture out of the housing, an axle gear housing lid, said axle gear housing lid removably fastened to said axle gear housing at said axle gear housing sealing surface.

References Cited by the Examiner

UNITED STATES PATENTS

| | | | |
|---|---|---|---|
| 1,614,992 | 1/27 | Roberts | 74—607 XR |
| 1,944,612 | 1/34 | Repeck | 74—713 |
| 2,651,216 | 9/53 | Alden | 74—713 |
| 2,701,972 | 2/55 | Hoffman | 74—607 |

DON A. WAITE, *Primary Examiner.*